(No Model.)
J. W. HYATT
DIFFERENTIAL PRESSURE GAGE.
No. 283,490.  Patented Aug. 21, 1883.
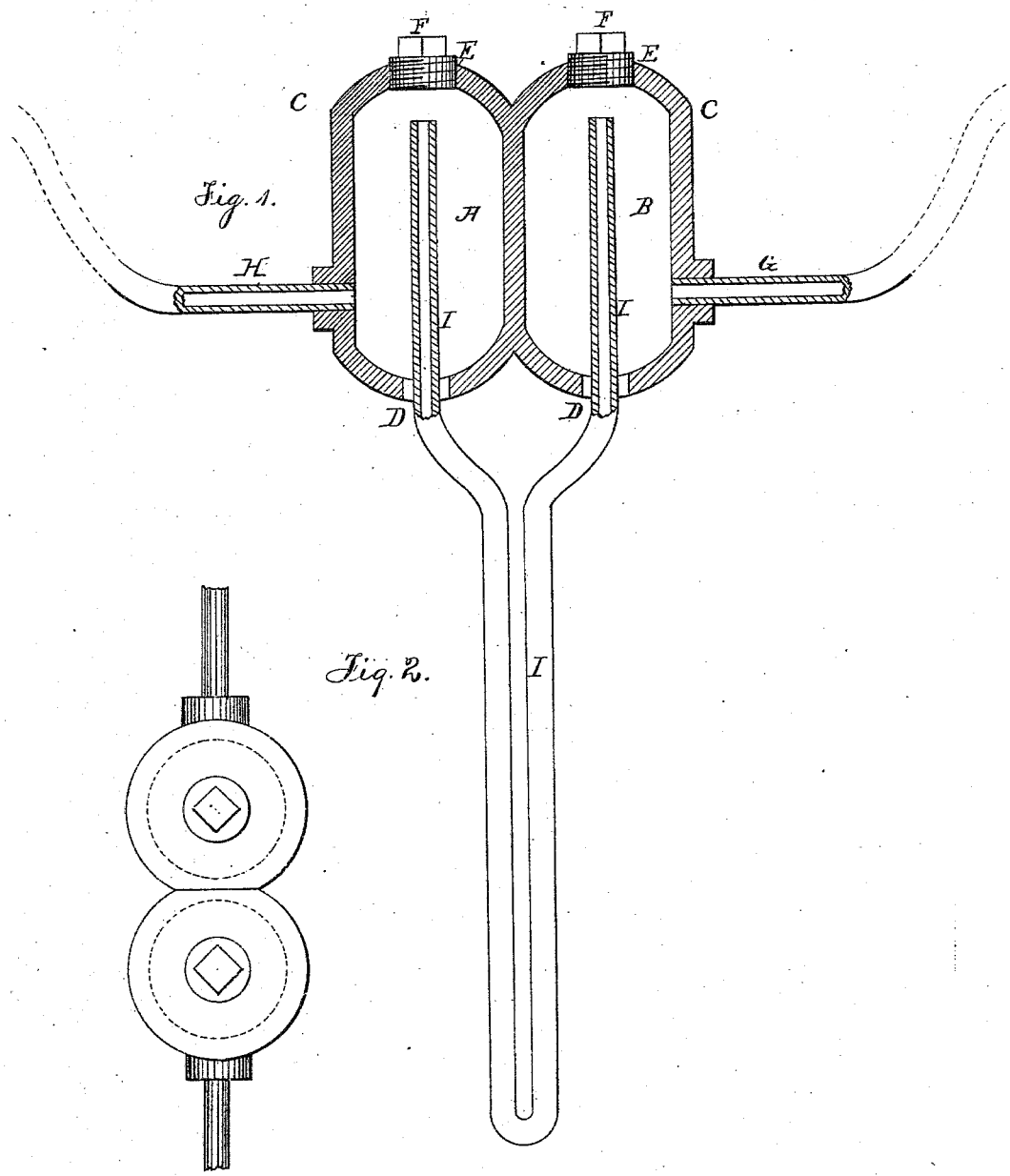
Witnesses:
Chas. C. Gill
Herman Gustow
Inventor:
John W. Hyatt,
By his Attorney,

UNITED STATES PATENT OFFICE.

JOHN W. HYATT, OF NEWARK, NEW JERSEY.

DIFFERENTIAL PRESSURE GAGE.

SPECIFICATION forming part of Letters Patent No. 283,490, dated August 21, 1883.

Application filed March 7, 1882. Renewed January 3, 1883. (No model.)

*To all whom it may concern:*

Be it known that I, JOHN W. HYATT, of Newark, in the county of Essex and State of New Jersey, have invented a new and useful Improvement in Differential Pressure Gages, of which the following is a specification, reference being had to the accompanying drawings.

The invention relates to an improved differential pressure gage, the nature and objects of which will be fully understood from the description and claims hereinafter presented.

Referring to the accompanying drawings, Figure 1 is a side view, partly in section, of an embodiment of the invention; and Fig. 2 is a top view of same.

A B denote two independent chambers, which will be adapted to be made air-tight when desired, and will preferably be formed of a single casting, C. Each chamber A B is supplied with an aperture, D, at its lower end, and a threaded aperture, E, at its upper end, the aperture E being closed when the device is in operation by the plugs F. An inlet-pipe, G, leads to the chamber B, and an outlet-pipe, H, extends from the side of the chamber A.

The indicating-tube I may be of any appropriate material; but I greatly prefer to employ transparent celluloid, since by its use I am able to produce a gage of a more effective character than when a glass indicating-tube is employed. The loss and danger incurred by the use of gages having glass tubes is well understood. The fragile nature of glass renders it liable to be broken at any time, and the gage thereby rendered worthless, besides sustaining loss. The celluloid tube, on the contrary, will not break when subjected to any ordinary jars or blows. I particularly recommend the employment of the celluloid tube on hydraulic machinery, and in all other instances where the gage is not subjected to great heat. The tube I is folded or bent at about its center and its two open ends inserted in the casting C through the apertures D, the ends passing well up into the chambers A B. I secure the tube I in the chambers A B, and at the same time effectually seal the apertures D by a mixture of litharge and glycerine poured around the ends of the tube in the base of the chambers A B. It is plain that various means may be employed for sealing the apertures D and retaining the indicating-tube I in place, and I mention the employment of litharge and glycerine only as one effective method of accomplishing the desired object.

The construction of the gage having been now described, I will proceed to set forth its operation. I first remove the plugs F and pour oil, preferably sperm-oil, into the tube I until it is nearly full. I then inject mercury into one end of the tube I, whereby the oil is displaced through the other end thereof and the mercury permitted to find its natural position in the tube, occupying the entire bend thereof. After a sufficient quantity of mercury has been poured into the tube I to form a column about half filling the parts on each side of its bend, I inject enough oil to completely fill the tube above the mercury, following which the chambers A B are filled with the oil and the plugs F screwed home, care being taken to exclude all air from the chambers. It being supposed, for purposes of illustration, that in the present instance the gage is in connection with a filter for purifying water, the pipe G will be connected with the supply and the pipe H with the delivery, and both pipes filled with water. When the gage is in the condition described, it is ready for use. It is obvious that when the pressure on the pipes G and H is the same, the mercury in the two sides of the tube I will be on about the same plane, and that when the pressure on the inlet-pipe G is greater than the pressure on the outlet-pipe, the water in the former will be forced into the chamber B, whereby a portion of the oil therein will be caused to enter the tube I, depressing the column of mercury in one side of the tube and elevating that on the other, part of the oil in the chamber A being, by the movement of the mercury, forced into the pipe H. It is also obvious that when the pressure in the pipe H is greater than that in the pipe G an opposite effect on the oil and mercury results. The difference in the height of the mercury in the sides of the tube I indicates the difference in pressure on the supply and delivery.

In the embodiment of the invention illustrated in the drawings the inlet-tube for water is at the lower end of the chamber B, and when so situated the oil employed will be of less specific gravity than the water, in order that the tendency of the water will not be to rise and displace the oil in the upper part of the chambers. When the oil is heavier than the water, the inlet-tube will be at the upper end of the chamber, since by its specific gravity the oil will remain in the chamber and not seek to enter the inlet-pipe.

I do not limit myself to the use of oil in connection with my gage, since other fluids may be substituted for the oil and employed with good results.

What I claim as my invention, and desire to secure by Letters Patent, is—

1. A gage consisting of two chambers inclosing the open ends of an indicating-tube, the chambers having an inlet and outlet and containing a fluid, the tube containing an appropriate quantity of mercury and the fluid, substantially as set forth.

2. A gage consisting of the air-tight chambers A B, having an inlet and outlet, and the tube I, substantially as and for the purposes set forth.

In testimony that I claim the foregoing improvement in gages, as above described, I have hereunto set my hand this 21st day of February, 1882.

JOHN W. HYATT.

Witnesses:
CHAS. C. GILL,
HERMAN GUSTOW.